US005546298A

United States Patent [19]
Rohner

[11] Patent Number: 5,546,298
[45] Date of Patent: Aug. 13, 1996

[54] METHOD FOR THE PARALLEL CONNECTION OF INVERTERS BY REFERENCE TO EXTREME CURRENT VALUES

[75] Inventor: Ronald Rohner, Baden, Switzerland

[73] Assignee: Inventio AG, Hergiswil NW., Switzerland

[21] Appl. No.: 160,163

[22] Filed: Dec. 2, 1993

[30] Foreign Application Priority Data

Dec. 3, 1992 [CH] Switzerland ............... 03714/92

[51] Int. Cl.⁶ .................................... H02M 7/00
[52] U.S. Cl. ............................. 363/71; 363/65
[58] Field of Search .......................... 363/65, 71

[56] References Cited

U.S. PATENT DOCUMENTS 4,163,906  8/1979  Shimanura ..................... 307/39
5,357,417 10/1994  Desvaux ........................ 363/71
5,434,771  7/1995  Danby et al. ................... 363/71

FOREIGN PATENT DOCUMENTS 0489971  6/1992  European Pat. Off. ......... H02M 7/48
4023207  4/1991  Germany ....................... H02M 1/08
4038869  8/1991  Germany ....................... H02M 1/08

Primary Examiner—Peter S. Wong
Assistant Examiner—Y. Jessica Han
Attorney, Agent, or Firm—Greenblum & Bernstein P.L.C.

[57] ABSTRACT

Method for the parallel connection of inverters by reference to extreme current values. The method achieves an equalizing regulation of the currents of several parallelly connected inverters each time the inverter with the highest current value is switched and that the instant of switching of all inverters, apart from the one switched first, depends on a comparison of its respective current value with the current value of at least one earlier switched inverter.

16 Claims, 3 Drawing Sheets

METHOD FOR THE PARALLEL CONNECTION OF INVERTERS BY REFERENCE TO EXTREME CURRENT VALUES

CROSS REFERENCE TO RELATED APPLICATIONS

This application claims the priority of Swiss Patent Application No. 03 714/92-9, filed Dec. 3, 1992, the disclosure of which is incorporated herein by reference in its entirety.

BACKGROUND OF THE INVENTION

1. Field of the Invention

This invention pertains to the equalization regulation of the currents of several inverters connected in parallel.

2. Discussion of the Background of the Invention and Material Information

The realization or utilization of fast inverters with several individual devices connected directly thereto, in parallel, is possible only With-appreciable expenditures on the part of the electronic control and regulating system. This expenditure is tolerable only when certain demands on the inverter cannot be fulfilled in other ways and/or a parallel connection offers decisive advantages over the conventional solutions with an individual device.

An object of the development of present-day motor constructors and designers is the construction of machines that rotate ever more rapidly with so-called "fast-running drives" requiring operating frequencies of above 500 hertz. With the aimed-at power of several hundred kVa, conventional thyristor inverters or GTO-(Gate Turn Off)-inverters can make these frequencies available, at most, only in the form of a fundamental frequency keying.

The disadvantages of this coarse rectangular voltage modulation and the non-sinusoidal current curve resulting therefrom is known sufficiently in the form of additional losses and torque Shocks. Methods have therefore been used for a long time, which subdivide these voltage blocks into small units in time and thus achieve an almost sinusoidal course of motor current. For the inverter, this means that the power switches must be switched on and off correspondingly more rapidly. The faster the actuation of the switches, the finer is the subdivision of the voltage blocks and the more sinusoidal becomes the motor current.

If the operating frequency is now raised, from the usual 50 to 120 hertz to more than 500 hertz, in fast-running drives, the switching frequency of the switches must also be raised correspondingly. This means that the thyristor switches and GTO-switches even more closely approach the limit of their switching speed.

Fast inverters with switching frequencies up to 100 kilohertz, which make a sinusoidal current curve possible even at a starting frequency of 500 hertz, are commercially available only up to a power class of about 50 kVa. A power increase to several hundred kVa with a constantly or consistently high pulse rate is, to the present day, hardly feasible in a conventional manner, hence the reason for parallel connected inverters. In an electrical coupling of the energy delivered by the individual inverters, the individual pairs of the partial converters are connected, one with the other, and the load is connected as usual. The partial inverters can be connected with each other either by way of large connecting chokes, which exercise only a system-caused function, or by way of small chokes, which have only protective functions. The latter case is referred to as direct coupling.

It is known to provide a superordinate total current regulation which adjusts the sum current $I_i$, of all individual partial inverters, to follow a target magnitude $I_s$. For this purpose, the currents of all-partial inverters are measured and added. In principle, it does not matter for the parallel connection of the partial inverters whether a PWM, an on-off regulation or another method is utilized in the case of the regulating methods of the superordinate total current regulation.

This total current regulation thus makes the actual value follow the target value in that it decides whether all partial inverters together will supply more or less current in the future, i.e., whether the corresponding "upper" or "lower" power switches in the individual partial inverters will be switched on or off, each time. In other words, the partial inverters are synchronized in that the switching states of their power switches are determined directly by the total current regulation.

The division of the total current, over the individual partial inverters, takes place according to a preset division rule which will usually provide the same currents for all partial inverters.

Since individual partial inverters can, however, now have very different properties (for example different internal resistances or internal inductances in consequence of component tolerances, production tolerances, different environmental conditions and so forth), deviations often result from this current division rule. For this reason, a subordinate equalizing regulation is utilized, which makes certain of the prescribed current division between the individual partial, inverters.

An example of such an equalizing regulation is described in prior art German Patent Publication DE 4 023 207 C1. Therein, the currents of the individual partial inverters are regulated in such a manner that the instant of switching-on and switching-off of each individual inverter is regulated on the basis of the difference between the current delivered by it and the current value corresponding to its target portion of the total current. Thereby, the currents of the individual partial inverters are made to follow their common mean value and a wide divergence of the Currents is thus prevented. It is, however, not the deviation from the mean value of all currents that is decisive for a current division contrary to the rule, but, for example, in the case of a direct current divider, the greater negative deviation (minimum value) when the power switches are deactivated and the greatest positive deviation (maximum value) when the power switches are activated.

SUMMARY OF THE INVENTION

It is a primary object of this invention to minimize these extreme deviations of the currents. The method of this invention pertains to the method for the parallel connection of a plurality of pulse-modulated inverters, wherein the outputs of the inverters are connected directly or via chokes, and wherein the times of switching-on and switching-off of the parallelly connected plurality of inverters are determined by a control circuit, wherein the method comprises switching, when the current is rising, that one of the plurality of inverters which carries the greatest current; switching, when the current is falling, that one of the plurality of inverters which carries the least current; and determining the instant of switching of each of the plurality of inverters to be switched, except for that one of the plurality of inverters which is switched first, in dependence-on a reference instant at which the current of at least one of the plurality of inverters is switched before it fulfills a preset condition.

In differing embodiments of this invention the noted reference instant can be that instant at which the current of the first one of the plurality of inverters to be switched first fulfills a preset condition; or at which the current of the last one of that plurality of inverters to be switched fulfills a preset condition; or at which the current of the previously switched inverter assumes an extreme value.

In another embodiment of this invention, the instant of switching of each of the plurality of inverters not switched first is delayed relative to the reference instant by a time interval which is a function of the difference existing in the reference instant between the current of that inverter of the plurality of inverters that was switched previously and that of the inverter to be switched. Preferably, the noted function is a linear function of the difference in the current.

In yet a further embodiment of this invention, the reference instant is that instant at which the current of that inverter of the plurality of inverters to be switched becomes the extreme value of all of the inverter currents. In one illustrative example of this invention, the noted instant of switching is equal to the reference instant. It shall be explained more closely in the following by reference to the Figures.

BRIEF DESCRIPTION OF THE DRAWINGS

The invention will be better understood-and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF-THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

The following description relates to an inverter arrangement or system, which is built up of several parallelly connected partial inverters, wherein the corresponding individual phases of the partial inverters are conductively connected, one directly, or via chokes with the other. In this case, it is to be noted that only one phase is illustrated, each time, in the accompanying drawing figures, for the sake of simplicity and clarity; the remaining phases are to be thought of in an analogous mode and manner. This is particularly the case when mention is made of "corresponding power switches in the individual partial inverters", it is to be understood that the "upper" or "lower" power switches of the same phase of the individual partial inverters are connected together.

Figure 1:
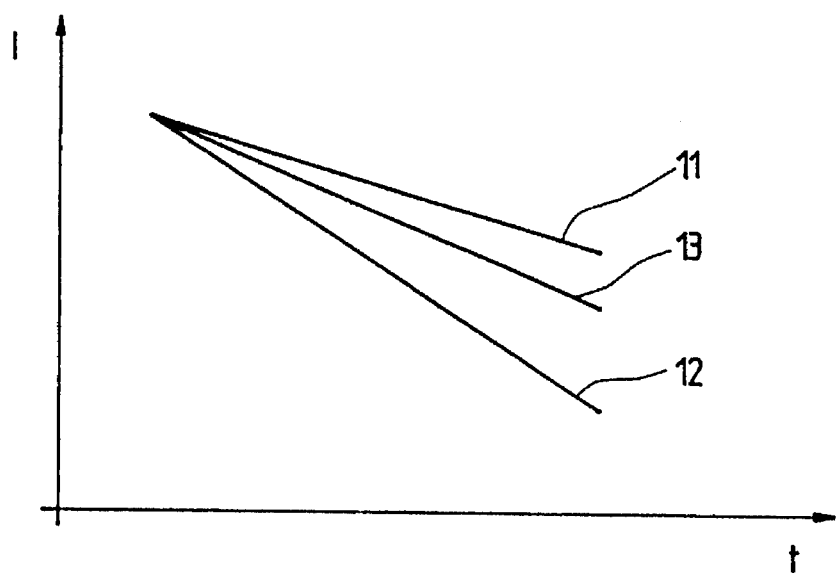
FIG. 1 shows the currents of three partial inverters with falling current values.
Figure 2:
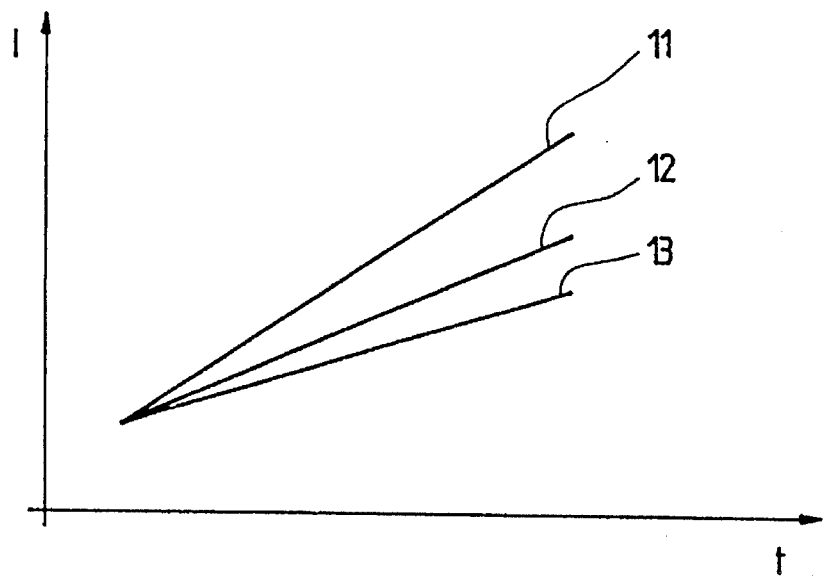
FIG. 2 shows the currents of three partial inverters with rising current values.

As already noted, the entire plant, built up of several parallelly connected partial inverters, has a superordinate total current regulation which in a known manner makes the actual sum of all currents follow a target value and will not be described in any further detail. It is assumed here that the division, which is to be maintained, of the total current, will follow a rule which provides for equal currents for all partial inverters. Due to the unavoidable differences in the properties of the different partial inverters, they do, however, deliver different current values, the temporal courses of which can approximately assume those shown in FIG. 1 for switched-off power switches, and approximately assume those shown in FIG. 2 for switched-on power switches. In these figures,. $I_1$, $I_2$ and $I_3$ denote the currents of three partial inverters.

Figure 3:
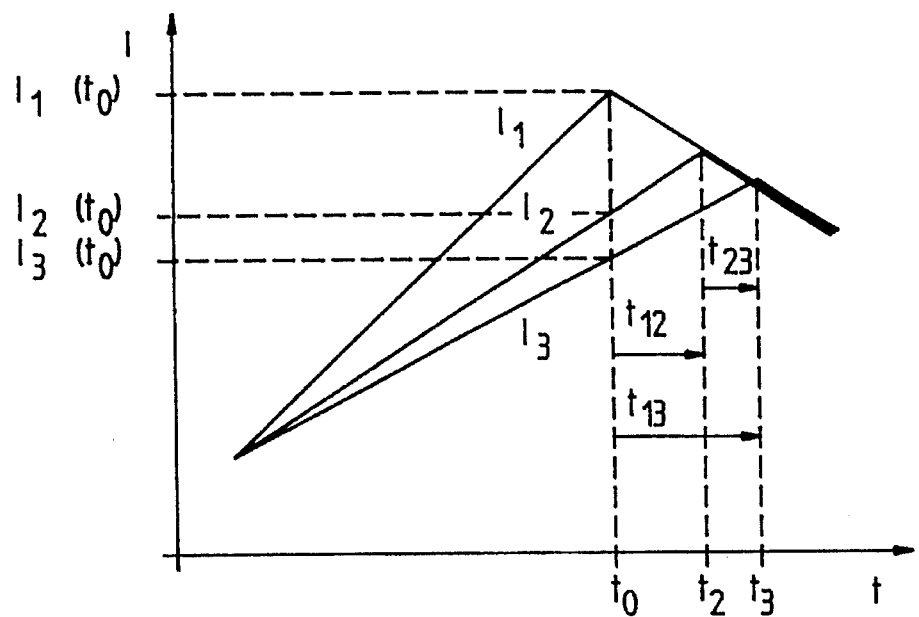
FIG. 3 shows the determination of switching times on the basis of delays relative to a reference instant.
Figure 5:
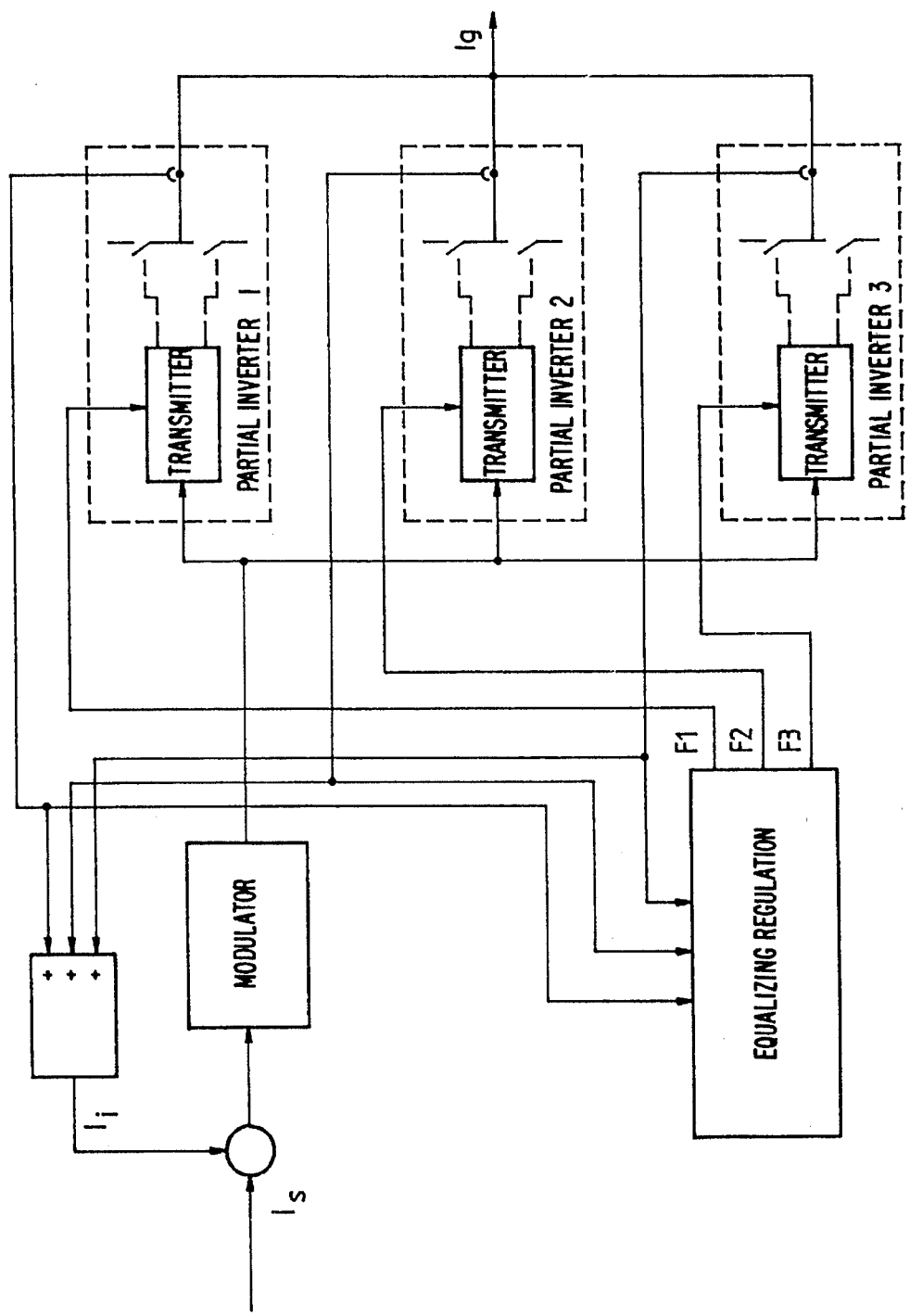
FIG. 5 is a schematic diagram, restricted to one phase, of an arrangement or system for the performance of the method.

FIG. 3 illustrates a form of execution or an embodiment of the method of this invention, namely for a rising current I, in a plant with three partial inverters which are denoted by numerals 1, 2 and 3 ( FIG. 5 ). The relationships in the case of a falling or decreasing current are representable by a simple change in the sign of the time derivative. In the case of the relationships, which are illustrated in FIG. 3, of the currents $I_1$, $I_2$ and $I_3$ in the three partial inverters, only the inverter "1" which carries the greatest current, is switched off on the basis of a comparison of the total actual current with the corresponding target value. Here, the instant time $t_o$, in which this occurs, is denoted as "reference instant".

Thereafter, inverter "2" carrying the second largest current is switched off with a computed delay time $t_{12}$ relative to time $t_o$ and finally inverter "3" with a delay-time $t_{13}$ likewise relative to time $t_o$ is switched off. The switching-on processes occur in corresponding manner. The computation of the delays can, for example, occur on the basis of the formula:

$$t_{in}=[I_1(t_0)-I_n(t_0)]\cdot k, \text{ (with } n=2, 3).$$

In that case, $I_2(t_0)$ and $I_3(t_0)$ are the currents of the inverters "2" and "3" at the instant that the inverter "1" is switched off and k is a factor which depends on the internal resistance or the internal inductance of the partial inverters, the intermediate loop voltage $U_z$ as well as the inequality of the partial inverters and the influence of the build-up of the plant. Since not all influencing factors are, as a rule, known with sufficient accuracy, the factor k must be chosen empirically to be so large that the respective delays suffice to bring about the current equalization. A possibility of realization is illustrated in FIG. 5, in which the equalization regulation sends corresponding release signals $F_n$ to the transmitters of the partial inverters as soon as the corresponding delays have taken place.

It is however, also possible to apply a sequential principle, i.e., a time delay is always computed only for the next following partial inverter, thus from the partial inverter with the extreme value, then from the partial inverter with the value nearest to this extreme value and so forth. In the example of FIG. 3, then not the delays $t_{12}$ and $t_{13}$ but the delays $t_{12}$ and $t_{23}$ are computed and, namely, each time on the basis of magnitudes which are obtainable respectively at time $t_0$ and time $t_2$. The execution of this method for more than three parallelly connected inverters should be evident on its own.

In a further manner of carrying out the method of this invention, the equalization is forced in a quite radical mode and manner in that the currents of the partial inverters are brought directly to the prescribed ratio of their division values through an appropriate control of the instants of switching within a small fraction of the pulse interval. Although the inverter carrying the respectively largest (or smallest) current is still always switched, the instant of switching of each inverter, apart from the inverter that is switched first, is nevertheless determined by a direct comparison of its current with the currents of the previously switched inverters. As a rule, each inverter apart from the first switched inverter, will be switched at the instant at which its current becomes the extreme value of all inverter currents. Departures from this rule are, however, also feasible. Thus, a certain delay can be accepted or the instant can be chosen at which the current of the inverter to be switched exceeds either that of the one immediately before it or that of the first switched inverter.

Figure 4:
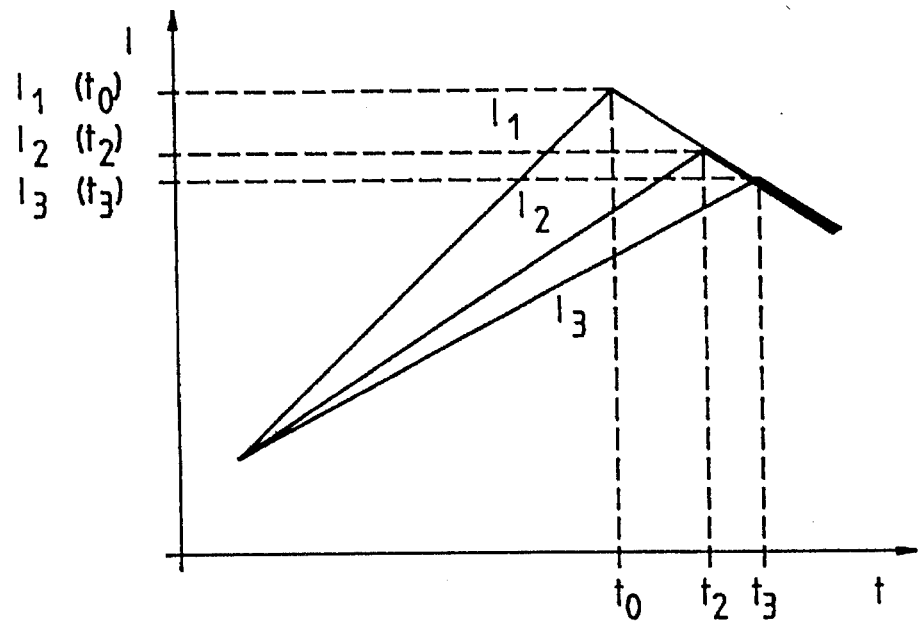
FIG. 4 shows the determination of switching times on the basis of current equalities.

FIG. 4 shows the corresponding relationships. Although the total course of the currents looks the same as in FIG. 3 and the inverter "1", carrying the largest current, is again switched off first on the basis of a global target value, the switching times $t_2$ and $t_3$ of the other two inverters are determined in another manner. The second as well as the third inverter is switched off when its current becomes the extreme value, i.e., when it exceeds, the values of both the other currents in the shown example. In this method, also the superordinate regulation is responsible for the desired total current being set in the case of the division ratio now secured. FIG. 4 shows this method for the case of the switching-off operation of the power switches. The partial inverter with the extreme current value is switched off first. As soon as the now falling current is equally as great as the current $I_2$ nearest to this extreme value, this power switch is also switched off and so forth. The switching-on operation takes place in a corresponding mode and manner.

FIG. 5 shows the schematic diagram of a plant or system for performing the method of this invention, wherein for the sake of simplicity, only one phase, consisting of three parallelly connected partial inverters, is shown. In the embodiment illustrated in FIG. 5, the functional block of equalizing regulation for this method consists of a computing block which, for example, in the case of a switch-off command of the modulator, continuously monitors all actual currents of the partial inverters and generates the corresponding release signals $F_n$. This means that the release signal for the partial inverter, with the extremes- actual current is transmitted immediately on the switch-off command of the modulator. Then, for example in the last-mentioned method, there is a waiting period until another partial inverter supplies the extreme actual current of all inverters, inclusive of the one already switched, whereupon it also issues its release signal $F_n$ and the switch-off command of the modulator is thus transmitted to the power switches and so forth.

The regulation of the total current is based on a comparison between target current value ($I_s$) and actual current value ($I_i$) with subsequent pulse pattern generation in the modulator. Whether this modulator performs a classical pulse width modulation, or uses any other known method, has no influence for the parallel-connection method described herein. It is likewise of no significance whether the total current $I_i$ is formed, al illustrated in FIG. 5, on the basis of an addition of the actual currents of the partial inverters or whether it is measured separately by a current-measuring member intended exclusively for this purpose. The switch-on and switch-off commands, generated by the modulator, for the power switches are transmitted to the individual partial inverters, i.e., all partial inverters receive the same switching commands for the corresponding power switches from the modulator. These switching commands are now intermediately stored in the so-called transmitter in each partial inverter and transmitted to the power switches only when the equalization regulation issues a corresponding release command $F_n$ (wherein n=1, 2, 3). The generation of these release commands in the equalizing regulation is based on one of the methods previously described herein.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A method for the parallel connection of a plurality of pulse-modulated inverters, wherein outputs of said inverters are connected by one of directly and via chokes, and wherein times of switching-on and switching-off of the parallelly connected plurality of inverters are determined by a control circuit, said method comprising the steps of:

switching, when the current is rising, a one of said plurality of inverters which carries the greatest current;

switching, when the current is falling, a one of said plurality of said inverters which carries the least current; and determining a time of switching of each of said plurality of inverters to be switched, wherein a first of said one of said plurality of inverters which is switched depends on an initial time at which the current of at least one of said plurality of inverters is switched before fulfilling a preset condition.

2. The method of claim 1, wherein said initial time is a time at which the current of the first one of said plurality of inverters to be switched first fulfills a preset condition.

3. The method of claim 2, wherein said initial time further is a time at which the current of a previously switched inverter assumes a greatest value.

4. The method of claim 3, wherein said time of switching of each of said plurality of inverters not switched first is delayed relative to said initial time by a time interval which is a function of a difference between an initiating time of said previously switched inverter of said plurality of inverters and an initiating time of a next inverter to be switched.

5. The method of claim 4, wherein said function is a linear function of the difference in said current.

6. The method of claim 2, wherein said initial time further is a time at which the current of an inverter of said plurality of inverters to be switched becomes the greatest value of all of said inverter currents.

7. The method of claim 6, wherein said time of switching is equal to said initial time.

8. The method of claim 1, wherein said initial time is a time at which the current of the last one of that plurality of inverters to be switched fulfills a preset condition.

9. The method of claim 8, wherein said initial time further is a time at which the current of a previously switched inverter assumes a greatest value.

10. The method of claim 9, wherein said time of switching of each of said plurality of inverters not switched first is delayed relative to said initial time by a time interval which is a function of a difference between an initiating time of said previously switched inverter of said plurality of inverters and an initiating time of a next inverter to be switched.

11. The method of claim 10, wherein said function is a linear function of the difference in said current.

12. The method of claim 8, wherein said initial time further is a time at which the current of an inverter of said plurality of inverters to be switched becomes the greatest value of all of said inverter currents.

13. The method of claim 12, wherein said time of switching is equal to said initial time.

14. The method of claim 1, wherein said initial time is a time at which the current of a previously switched inverter assumes a greatest value.

15. The method of claim 14, wherein said time of switching of each of said plurality of inverters not switched first is delayed relative to said initial time by a time interval which is a function of a difference between an initiating time of said previously switched inverter of said plurality of inverters and an initiating time of a next inverter to be switched.

16. The method of claim 15, wherein said function is a linear function of the difference in said current.

* * * * *